(12) United States Patent
LaVergne, Jr.

(10) Patent No.: US 7,028,985 B2
(45) Date of Patent: Apr. 18, 2006

(54) INLINE CONTROL VALVE WITH RACK AND PINION MOVEMENT

(76) Inventor: Morris LaVergne, Jr., 9031 Eaglecove Dr., Houston, TX (US) 77064

( * ) Notice: Subject to any disclaimer, the term of this patent is extended or adjusted under 35 U.S.C. 154(b) by 0 days.

(21) Appl. No.: 10/811,184

(22) Filed: Mar. 26, 2004

(65) Prior Publication Data
US 2005/0211941 A1    Sep. 29, 2005

(51) Int. Cl.
*F16K 1/00* (2006.01)
(52) U.S. Cl. .................................... 251/250
(58) Field of Classification Search .............. 251/250
See application file for complete search history.

(56) References Cited
U.S. PATENT DOCUMENTS
5,346,173 A * 9/1994 Rasmusson .................. 251/58
6,471,184 B1 * 10/2002 McIntosh ................... 251/321

* cited by examiner

*Primary Examiner*—J. Casimer Jacyna
(74) *Attorney, Agent, or Firm*—Darcell Walker

(57) ABSTRACT

The present invention provides an inline flow control valve for regulating the movement of materials through a flow line. The valve of the present invention has a design that provides external control of the inline plug instead of control based on flow pressure of the material flowing through the flow line. The valve of the present invention can comprise a one-piece housing design. This one-piece design can facilitate easier assembly and maintenance of the valve. The valve comprises a valve housing, a valve plug, guide member, and an actuation mechanism. This mechanism is a rack and pinion design comprising a shaft, a rotary pinion arm and a rack gear. The rack and pinion design converts circular motion from the shaft into linear motion of the valve plug in the flow line. The shaft, which an operator would use to control the motion of the valve plug, is not contained an integral valve bonnet.

8 Claims, 9 Drawing Sheets

INLINE CONTROL VALVE WITH RACK AND PINION MOVEMENT

FIELD OF THE INVENTION

This invention relates to a control valve apparatus for regulating the flow of materials (liquids and gases) through a flow line and in particular this invention relates to an inline flow control valve that uses a rack and pinion gearing mechanism to control the movement of a valve plug and thereby regulate the amount of material moving through a flowline. The invention further relates to an inline flow control valve that comprises a one-piece valve housing design to facilitate more efficient assembly and maintenance of the control valve.

BACKGROUND OF THE INVENTION

A valve is a mechanical device, which opens and closes in order to control the flow of materials, such as water, stream, oil, and gas chemicals, in flow lines such as pipes and vessels. Valves are used in a wide variety of familiar devices and many known tasks. For example, turning a dial on a gas stove varies the opening of a valve and regulates the flow of gas to the stove burner. The valve in an automobile tire allows air to enter but not to leave the tire. Valves in a steam radiator permit the air in the radiator to leave and the steam to take the place of air. In addition, valves may vary in size from a fraction of an inch to several feet, depending upon the diameter of the pipe or passageway. Valves are joined to a pipeline by threaded, flanged, or welded joints.

Some conventional valves consist of two main sections that form the valve housing/body: the bonnet section and the body section. The features of a conventional valve also include inlet and outlet openings to enable materials to flow through into, through and out of the valve. The valve also includes a restriction component (often referred to as a plug) that can be positioned in the area between the inlet and outlet opening to partially or totally restrict the flow of materials through the valve and thereby affect the flow rate and pressure of the materials. The fourth feature of the valve comprises an actuation mechanism to control the positioning of the restriction component between the two openings. Valve operators usually adjust the position of the restriction component through the actuation mechanism.

Valves fall into two broad types: linear and rotary. In a linear valve, the disc/plug lifts from the seat and moves in a direction that is perpendicular to the seat. By comparison, in a rotary valve such as a ball valve the disc rotates in the seat. Shown in FIG. 1 is a traditional type of linear valve called a gate valve. This valve has a stem 10 and plug 11 that moves in an up and down linear directions. A wheel 12 connects to the stem 10. The operator rotates the wheel in one circular direction (usually clockwise) to lower the plug into the flowline 13. Rotating the wheel in the opposite circular direction will cause the stem to move upward and thereby raising the plug out of the flowline. The valve also contains a bonnet 14 and a body 15 that form the valve housing.

This gate valve is ordinarily used in industrial and power-plant piping systems when it is necessary for the valve to be either fully open or entirely closed. This type of value (fully opened or fully closed) is fundamentally known as a shutoff valve. When the valve is open, the fluid passes straight through the flowline 13, with little restriction to cause pressure loss. In the solid-wedge type of gate valve, the plug 11 is forced down into two seat rings set at a slight angle. In the split-wedge, or double-disc, valve, the plugs are forced against the seats (body 15) by the wedging action of the stem 10 as it is screwed down.

FIG. 2 illustrates a traditional globe valve. This valve is named for its shape. Similar to the gate valve, this globe valve comprises a wheel, stem, bonnet, plug and body. The main difference as shown is a different lower configuration of the bonnet 14 and the body 15. In addition, FIG. 2 shows a different configuration for the plug 11. This valve interposes greater resistance to flow than the gate valve and is not pressure balanced except where control of flow or pressure, called throttling is required. The globe valve is superior to the gate valve for throttling service. In addition, globe valves always have rising stems. The hand wheel turns the screw in the threads of the bonnet, thereby either raising or lowering the plug.

Another type of valve is the diaphragm valve. This valve is similar to the globe valve except that a diaphragm of flexible material is clamped between the body and the bonnet. The valve stem, regulating the size of the opening through which the fluid flows and shutting the valve off when pressed down onto the seat, moves up and down the diaphragm. This construction isolates the working mechanism of the valve from the fluid. It requires no repacking or reseating, and is designed for corrosive and abrasive fluids, or for fluids carrying solid particles in suspension.

FIG. 3 shows a traditional check valve used to prevent reversal of flow in a pipeline or flow line 25. A check valve is similar in function to an electrical diode. This valve allows free flow in one direction but prevents flow in the opposite direction. There are two principal types of check valve: the swing check and the lift check. The swing check has a flapper disc 20 connected to a hinge 21. The hinge 21 is connected to a check valve cap 22. Flow shown in the direction shown in FIG. 2 will cause the disc to the flapper disc to swing down and seal against the seat 23 of the body 24. Fluid pressure in the direction 26 on the disc forces the disc down against the seat 23 and seals off the fluid flow. If the fluid flow reverses, the fluid pressure would cause the disc to swing up, allowing free flow of the fluid in a predetermined direction. A lift check operates similarly except that the disc rises vertically in a cylindrical guide.

The regulating/control valve differs from the shutoff valve in that the regulating valve maintains a constant but restricted flow and pressure. Often, these valves automatically vary the opening through the valve, thereby varying the flow of liquid. This regulated flow maintains a prescribed pressure. Moving the valve stem and the valve disc with respect to the seat does this variance. In many valves, the disk is generally of a special shape to provide the desired regulating characteristics. In the simpler types of valves the pressure to be maintained is applied to a diaphragm attached to the valve stem. This pressure is opposed by a spring or weight; the pressure to be maintained is adjusted by changing the spring tension or moving the weight on a lever. The pressure on the diaphragm usually comes either from the upstream or downstream pressure, whichever the regulator is set to control. There is usually no external power or actuation applied to the valve.

With respect to rotary valves, the ball valve has a spherical ball with a horizontal bore. The ball fits between two vertical seats each sealing against the ball in different directions. The valve stem rotates the ball 90°. When open, the ball's bore is aligned with the body's bore allowing free flow of the fluid. When rotated to the closed position, the ball's bore is perpendicular to the body's bore and the seats seal tightly on the ball's surface.

The rotary control valve is similar to the regulating valve. A power actuator, usually pneumatic, actuates the control valve or electric, conforming to a signal sent to the valve from a controller. A controller is a device that measures fluid flow rate, temperature, or pressure and compares the measurement to a preset valve in the controller. The controller sends a signal to the valve telling the valve to open to a proper position such that the flow measurement matches the preset valve. Control valves can have either linear motion or rotary motion. Control valves are used in almost all fluid control systems. A control valve is seldom closed or fully open. The control valve throttles fluid flow by causing a drop in fluid pressure across the valve. This function requires the valve to have a high resistance to flow erosion. The pressure drop may also cause cavitation in liquid flows and noise in gas or stem flows. Special valves have been designed to resist cavitation and to reduce noise.

In addition to the conventional control valves, there are also inline control valves. However, unlike conventional valves, that have a restriction mechanism that comes into and out of the flow path, the inline control valves have a fixed diverter member or plug positioned centrally of the flow passage with the fluid passageway of the materials flowing through the valve. This diverter has a uniform cross sectional area generally equal to the cross sectional area of the upstream and downstream flow passages to provide equal flow about the diverter member. A sleeve of a generally cylindrical shape is normally provided as a closure member for sealing against the fixed diverter member. The sleeve moves in a longitudinal direction between open and closed positions relative to the fixed diverter member.

Inline control valves can have a diverter that is spring biased and is moved by the pressure of the material flowing through the valve. This flow pressure varies the position of the diverter and therefore the flow path and the flow rate of the materials flowing through the flow line. This concept is similar to the previously discussed regulating valve.

There are various types of inline control valve designs. For example, U.S. Pat. No. 2,416,787 shows an inline control valve in which a fixed plug is mounted centrally of the flow passage and has a sleeve movable between open and closed positions relates to the fixed plug. The sleeve is urged by a separate source of pressurized fluid into a closed position against the fixed plug.

U.S. Pat. No. 2,590,466 shows a multi-stage sleeve valve having a fixed diverter member with a pair of discs to provide a two-stage seating of the sleeve against the fixed diverter member. Pressurized fluid from a separate fluid source urges the valve into sealing engagement with the fixed diverter member.

U.S. Pat. No. 4,880,206 shows a magnetic control valve in which the sleeve is fixed and a movable inline valve member forms the closure member and moves between open and closed positions relative to a fixed annular seat. A magnetic coil surrounds the valve member and the valve member forms a magnetic armature so that upon energizing of the magnetic coil, the valve member moves to a closed position. The outer annular seat does not move and does not form a movable closure member.

U.S. Pat. No. 5,435,337 describes an inline control valve for controlling fluid flow in which a fixed plug or diverter member is positioned centrally of the flow passage and a passageway formed between the plug and the outer housing is such that the cross sectional area is identical along the entire passageway thereby to provide equal flow along the plug to minimize turbulence. A sleeve of a generally cylindrical shape forms the closure member and moves between open and closed positions relative to the fixed plug. The sleeve is responsive to fluid pressure within the flow passage and is normally urged into closed position by the fluid pressure.

Although, many inline control valves exist, the pressure of the materials flowing through the valve activates the current inline valves. Many of these valves are spring biased to regulate the flow of the material through the flowline.

Mokveld offers an axial flow control valve that claims to significantly reduce noise and turbulence and prevents the erosion of untreated fluids in upstream applications. Mokveld claims that the in-line and symmetrical flow path eliminates indirect flows and unnecessary changes in flow direction through the valve. This valve has a two-piece actuation mechanism, which comprises first and second perpendicular rods. The first rod is attached to a piston positioned in the flowline. Movement of the second rod in a linear direction causes the movement of the first rod and attached piston in a linear direction. Although this valve incorporates the concept of an in-line flow control valve with an external actuation mechanism, the complicated nature of this design makes it a less attractive alternative.

There remains a need for an inline control valve that can be activated from an external location. In addition, there remains a need for a control valve that has a one-piece design to facilitate more efficient maintenance of the control valve. A one-piece design would eliminate the need to separate and dissemble the two-part housing of a conventional control valve. As previously mentioned, most valve housing designs have two main parts. During any maintenance to the valve, there will be a need to separate the these parts. As a result, the typical approach is the simply replace the valve needing maintenance with a new valve and then perform maintenance of the valve offline.

There remains a need for a valve that is assembled such that it is not necessary to separate the upper and lower portions of the valve during assembly and or maintenance.

SUMMARY OF THE INVENTION

It is an objective of the present invention to incorporate features of a conventional valve into an inline flow control valve.

It is a second objective of the present invention to have an inline flow control valve that depends on operator activation to control flow rate instead of fluid flow rate.

It is a third objective of the present invention is to provide an inline flow control valve design having a one-piece housing/shell configuration.

It is a fourth objective of the present invention to provide a valve design that has an inline movement that is activated and controlled from a location that is external to the valve plug of the inline control valve.

It is a fifth objective of the present invention to provide an inline flow control valve that has the capability to convert a circular force into a lateral inline movement of the valve plug.

It is a sixth objective of the present invention to provide a valve design that has a rack and pinion gearing mechanism to facilitate movement of a valve plug.

It is a seventh objective of the present invention to provide a valve that is easier to assemble and maintain.

The present invention provides an inline flow control valve for regulating the movement of materials through a flow line. The valve of the present invention has a design that provides external control of the inline plug instead of control based on flow pressure of the material flowing through the flow line. The valve of the present invention can comprise a one-piece housing design. This one-piece design can facilitate easier assembly and maintenance of the valve. The valve comprises a valve housing, a valve plug, a pair of guide members, and an actuation mechanism. This actuation mechanism is a rack and pinion design comprising a shaft, a rotary pinion arm and a rack gear. The rack and pinion design converts circular motion from the shaft into linear motion of the valve plug in the flowline. The shaft, which an operator would use to control the motion of the valve plug, is not contained in the valve bonnet as with most conventional linear and rotary valve designs.

The valve housing has inlet and outlet openings to enable the fluid or other materials to pass through the valve. The valve plug and rack gear are positioned in the valve housing. The rack gear is attached to the valve plug such that movement of the valve plug with respect to the guide member creates a flow path through the valve. Both the rack gear and pinion arm contain a set of teeth. Rotation of the rotary pinion arm via the shaft causes the teeth of the pinion arm to engage the teeth of the rack gear causing the rack gear and valve plug to move in a linear/lateral direction in the flow line. This movement of the valve plug will vary the area of the flow path in the valve and thereby control the rate of flow of a material through the valve. The rack and pinion design combines features of the both the linear actuation and rotary actuation methods.

An advantage of the present invention is that it combines features of an inline control valve with features of a conventional valve. This new design provides a valve with an inline plug, but external control of the plug as with conventional valves. This new design will be easier to assemble and maintain.

DETAILED DESCRIPTION OF THE INVENTION

Figure 1:
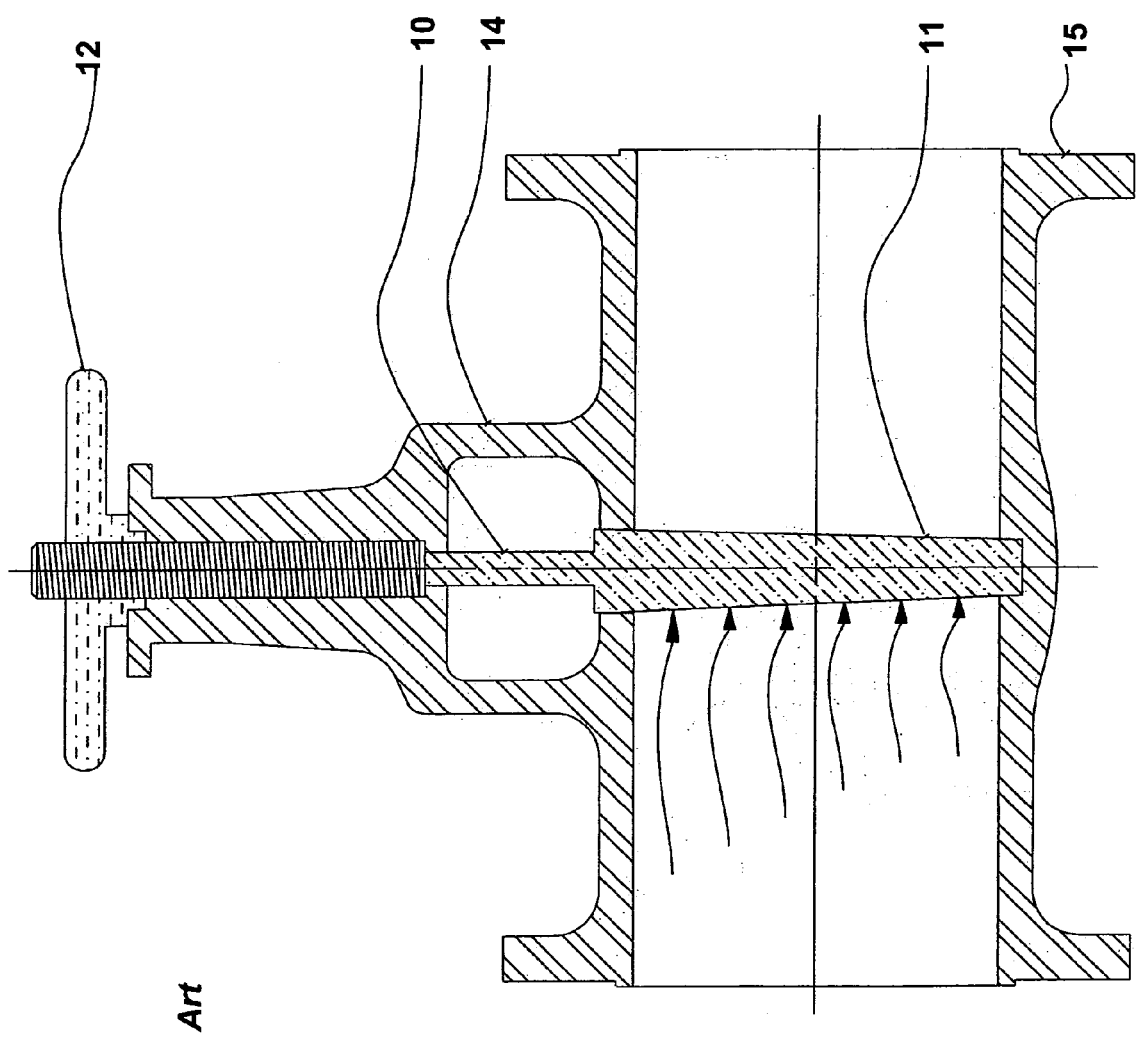
FIG. 1 shows a cross-section view of a traditional gate valve.
Figure 2:
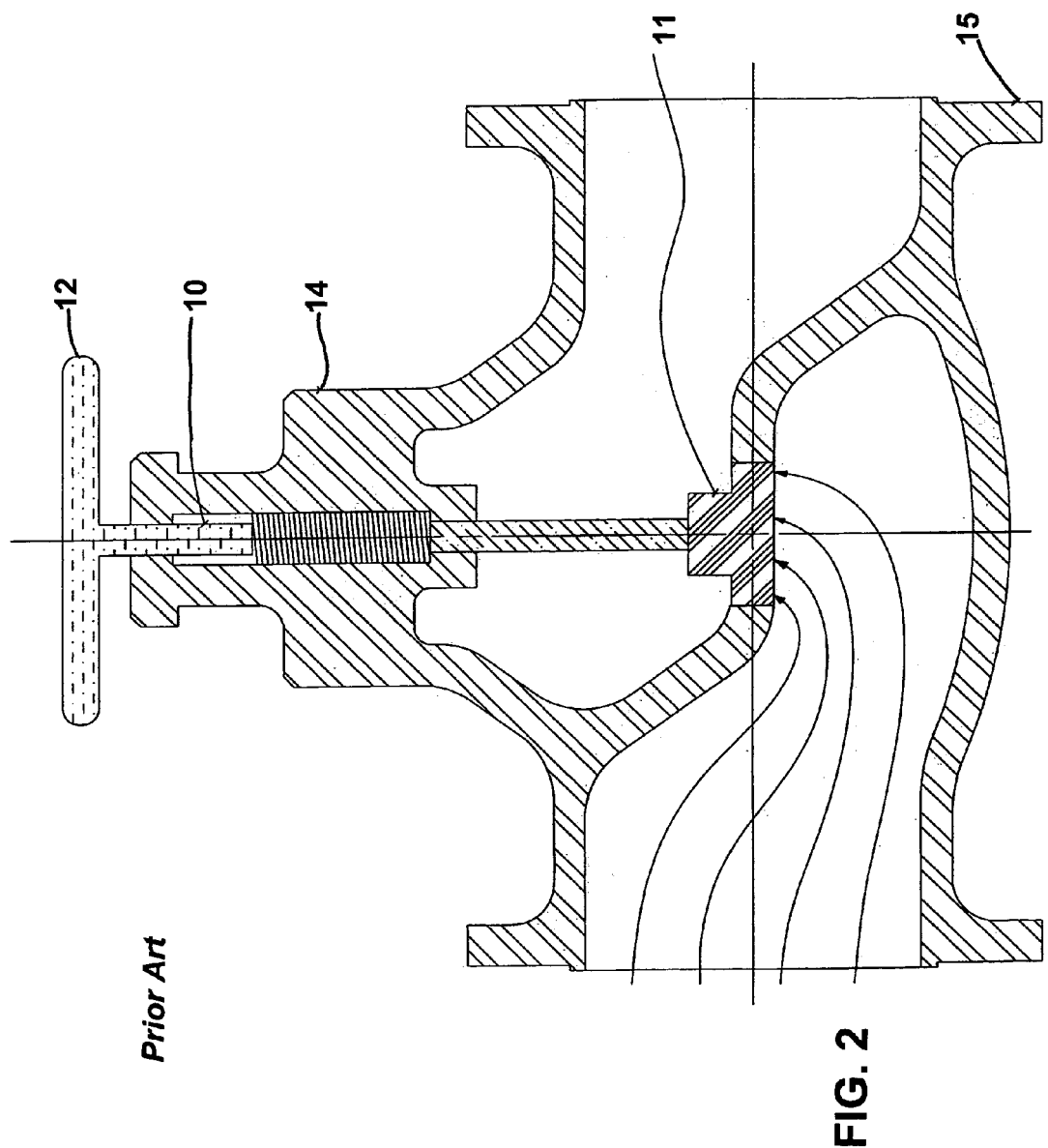
FIG. 2 shows a cross-section view of a traditional globe valve.
Figure 3:
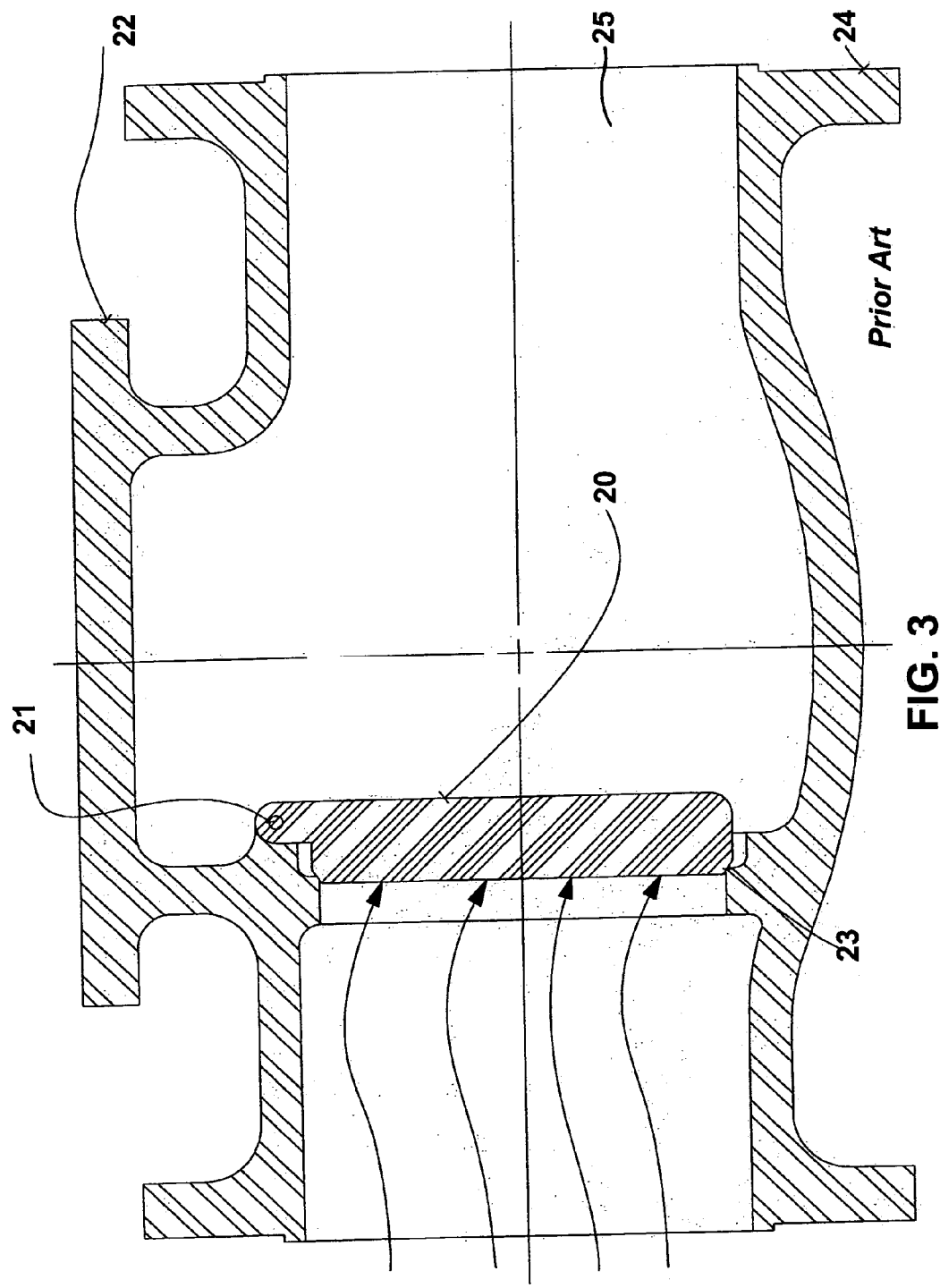
FIG. 3 shows a cross-section view of a traditional check valve.
Figure 4:
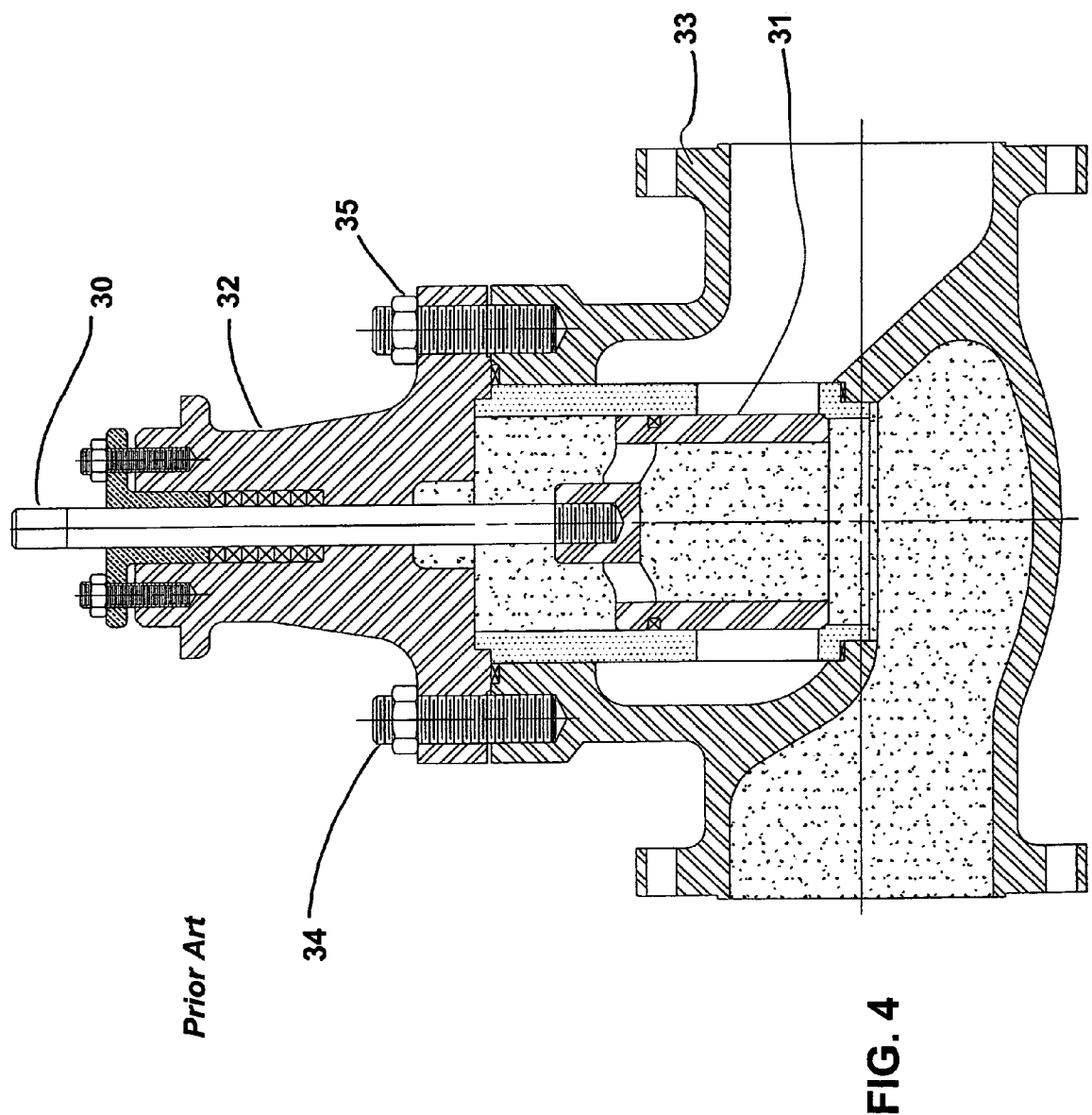
FIG. 4 shows a cross-sectional view of a conventional two-piece control valve.

FIG. 4 shows a cross-sectional view of a conventional two-piece control valve.

As with the previously described valves, this valve has a stem 30 and a plug 31 that restricts the flow of materials through the flowline. The valve has an upper piece bonnet 32 and a lower piece body 33. Bolts 34 and 35 connect the upper bonnet and the lower body pieces of the valve. The use of this two-piece configuration requires many considerations before implementation of this valve design. Based on the environment in which a valve of this design will be implemented, it will necessary to know the pressure of the materials flowing through the line before incorporating a valve of this design.

Figure 5:
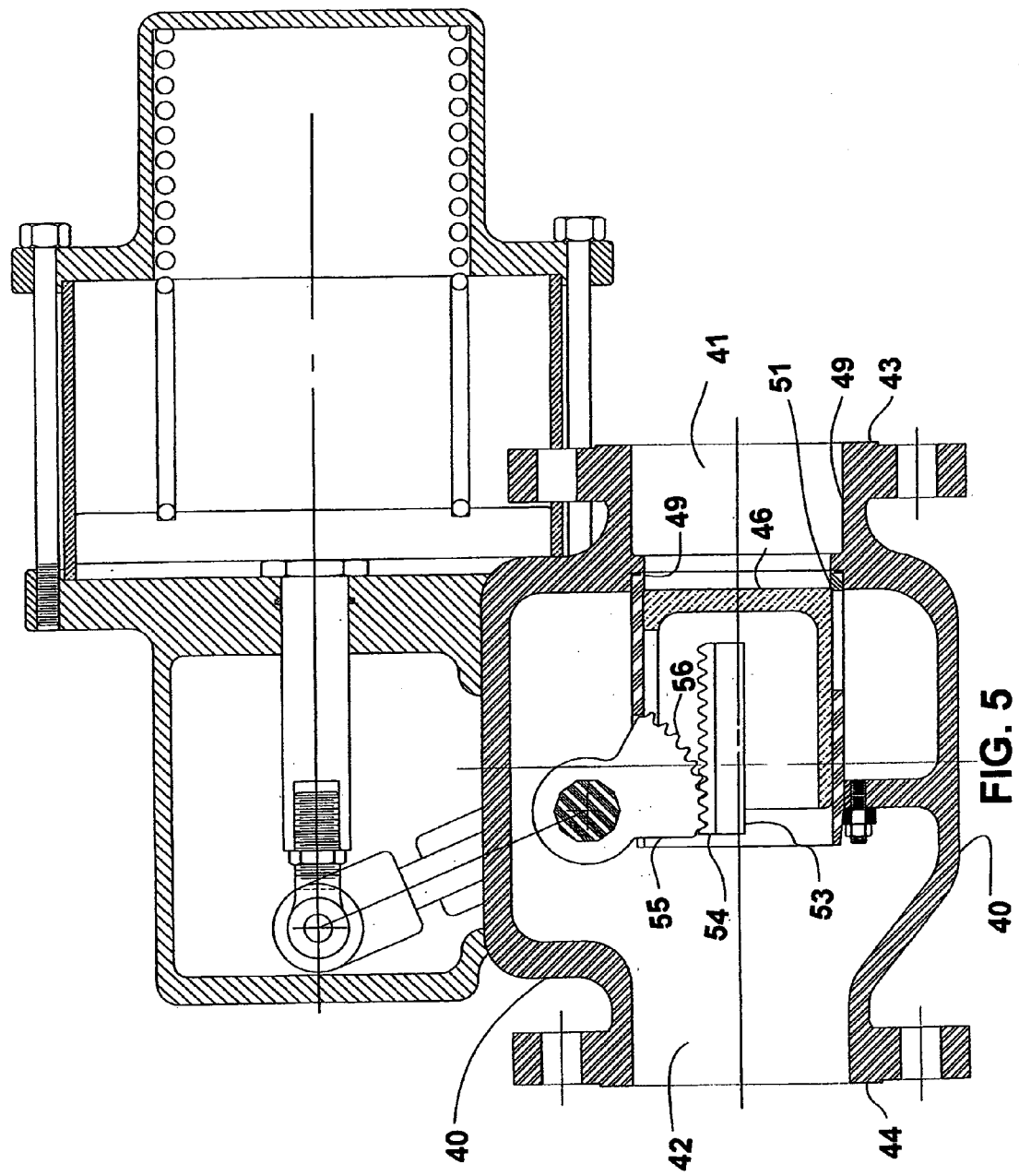
FIG. 5 shows a cross-section view of the inline control valve of the present invention in a closed position.

The one-piece design of the present invention will eliminate many of the environmental conditions when deciding to use a valve of this design. Referring to FIG. 5, there is a cross-section side view of the one-piece valve design of the present invention in an initially closed valve. This valve comprises a valve body (housing) 40 that houses the internal components of the valve. The valve body is positioned within a flow line that transports fluids or other materials. The valve body has an inlet opening 41 that allows the fluid material to enter the valve. An outlet 42 at the other end of the valve body allows the fluid material to exit the valve. Flanges 43 and 44 at each end of the valve body facilitate the incorporation of the valve into the flow line. Within the valve body 40 is a cylindrical chamber 45 (see FIG. 6) that contains the internal components of the valve. This chamber begins at the inlet 41 and can have a closed back end. Within this chamber is the valve plug 46. This valve plug is the element that moves in the flowline to vary the area of the flowline. This area variation restricts the flow of fluid material and thereby controls the flow of materials in the flow line. Cylindrical guide extend along the sides of the chamber and form an inner wall of the chamber. These guide members facilitate movement of the valve plug within the valve. The movement of the plug along an axis that is parallel to the guide chamber. Bolting retains this guide member to the side of the valve body. O-rings (not shown) seal the guide member to the valve body to prevent fluid from escaping the chamber through the valve body and guide member attachment. In addition, gaskets 49 at the end of each guide member also seal the valve, when the valve is in the closed position.

The valve plug 46 is a cylindrically shape with a closed front end that faces the inlet opening. As previously mentioned, the surface of the valve plug can move in a parallel direction with respect to the fixed position within the cylindrical guide members. As shown in FIG. 5, the valve plug 46 can have rack gear 53 attached to the walls of the valve plug by pins or welds. From FIG. 5, the upper end of the rack gear 53 comprises a set of teeth 54 that will engage a set of teeth 56 from rotary pinion arm 55. The rotary pinion arm extends down into the cylindrical valve plug and engages the rack gear teeth 54 and rack gear 53. A shaft 57 attaches to the rotary pinion arm 55 and extends outward and away from the rotary pinion arm. The shaft 57 is positioned such that it can cause the rotary pinion arm to rotate in either clockwise or counter-clockwise directions. A bushing and a set screw help facilitate the movement of the shaft 57.

Still referring to FIG. 5, the rack gear 53, the rotary pinion arm 45 and the shaft 57 comprise the actuation mechanism of the present invention. An operator can rotate the shaft connected to the pinion arm to cause a circular movement of the pinion arm. As the pinion arm rotates, the pinion arm teeth 56 will engage the rack gear teeth 54. The engagement of the teeth of the rotating pinion arm 56 with the teeth 44 of the rack gear will cause the rack gear to move in a linear direction either toward or away from the inlet opening in the valve body. Because the gear rack is attached to the walls of the valve plug by the pins or welds, any linear movement of the rack gear will cause the valve plug to move in the same linear motion with the rack gear. This linear movement of the valve plug will be a translation movement with respect to the guide members between the valve plug 46 and valve housing 40.

Figure 6:
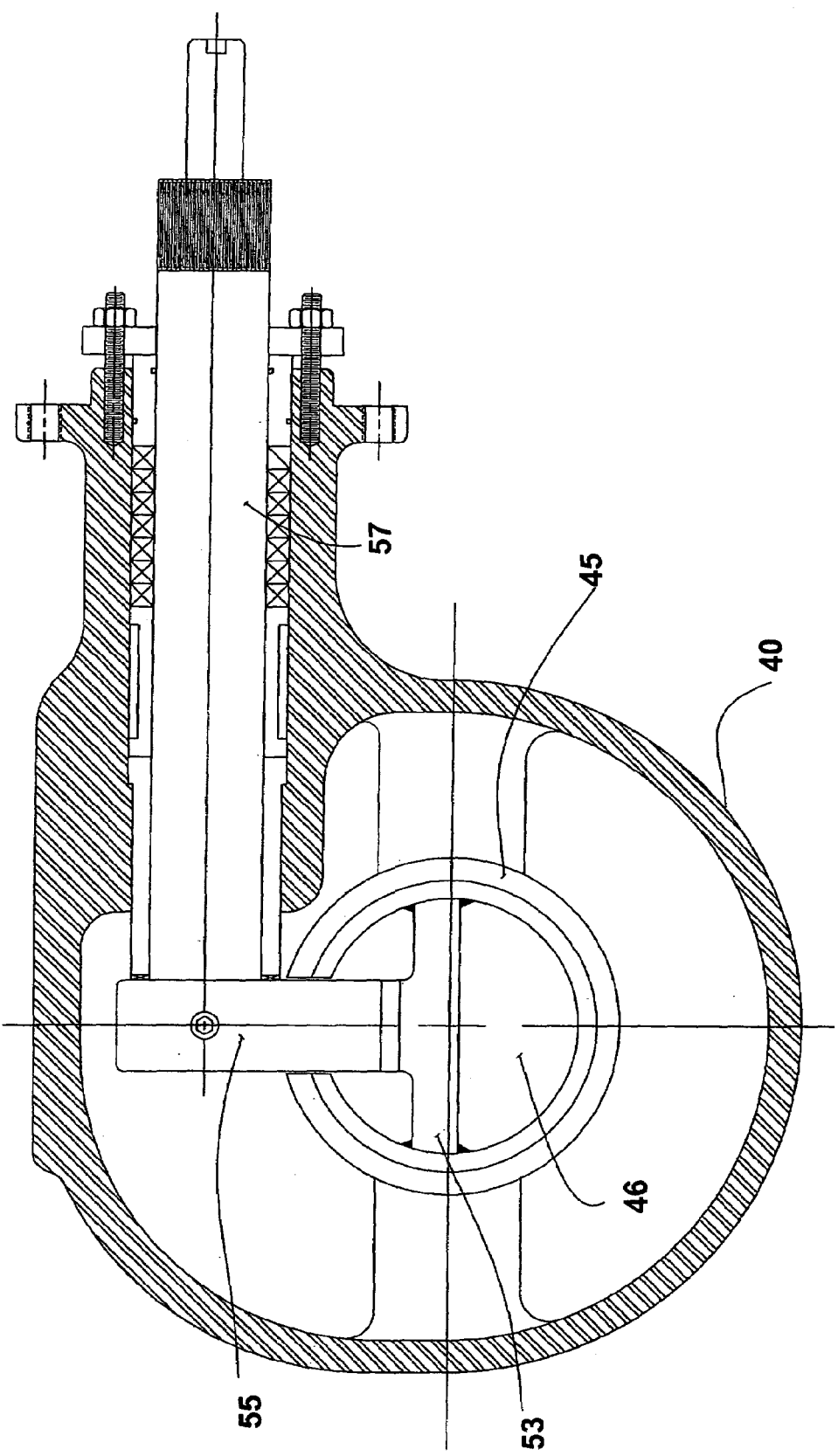
FIG. 6 shows an outlet end view of the inline control valve of the present invention.

FIG. 6 shows an end view of the inline control valve of the present invention. As previously mentioned, the invention comprises an inner cylinder 45 in the valve housing 40. When the inline control valve of the present invention is installed into the flowline, the cylinder will be in alignment with the flowline, which will enable fluids or gases to pass through the inline control valve. The shaft 57 attaches to the rotary pinion arm 55. The rotary pinion arm 55 engages the rack gear 53, which is attached to the valve plug 46. As the operator rotates shaft 57 in a circular direction, the rack gear and valve plug move in a linear direction with the cylinder 55 of the inline control valve.

Figure 7:
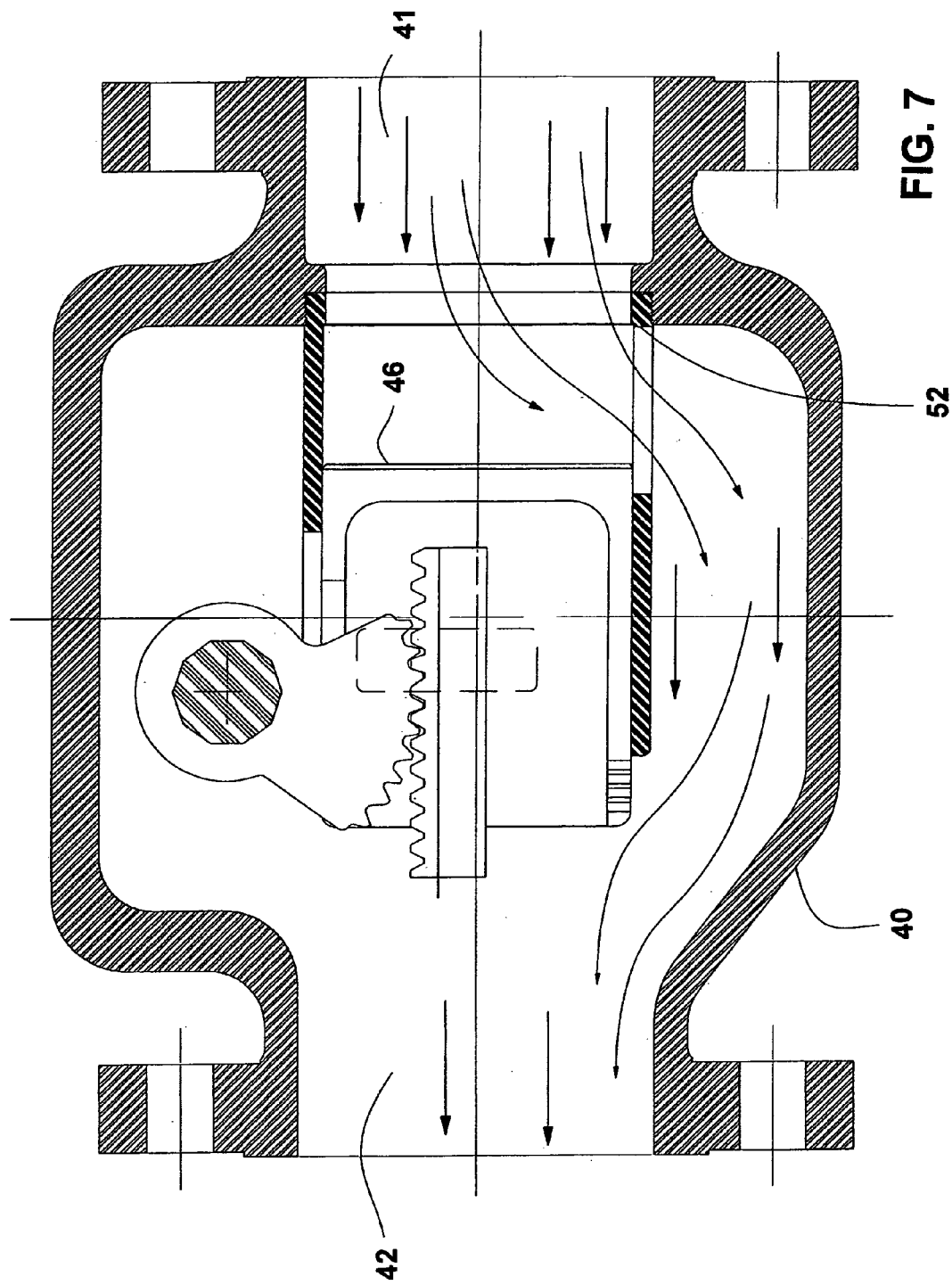
FIG. 7 shows a cross-section view of the inline control valve of the present invention in a partially opened position.

As shown in FIG. 7, a clockwise rotation of the rotary pinion arm should cause the rack gear and valve plug to move in a direction away from the valve inlet 41. This movement would partially open the flow path 52 in the valve and thereby cause fluid or other materials flowing in the flow line to pass through the valve as indicated by the arrows. An operator can vary the amount of the flow opening by the amount of rotation of the rotary pinion arm. In addition, when an operator desires to reduce the size of an opening or to close the valve completely, the rotation direction of the rotary pinion arm can be reversed from clockwise to counter-clockwise. A movement in a counter-clockwise direction will cause the rack gear and valve body to move in a direction toward the inlet opening and thereby cause the front closed end of the valve body and the walls of the valve body to cover the flow opening.

As illustrated in FIG. 5, the actuation configuration of the present invention enables the valve design to comprise only one main component, a valve housing 40. Most conventional valves especially linear require a two-piece valve design. This one-piece design has several advantages. The main advantage of this design is evident during the assembly and maintenance of the valve.

Figure 8:
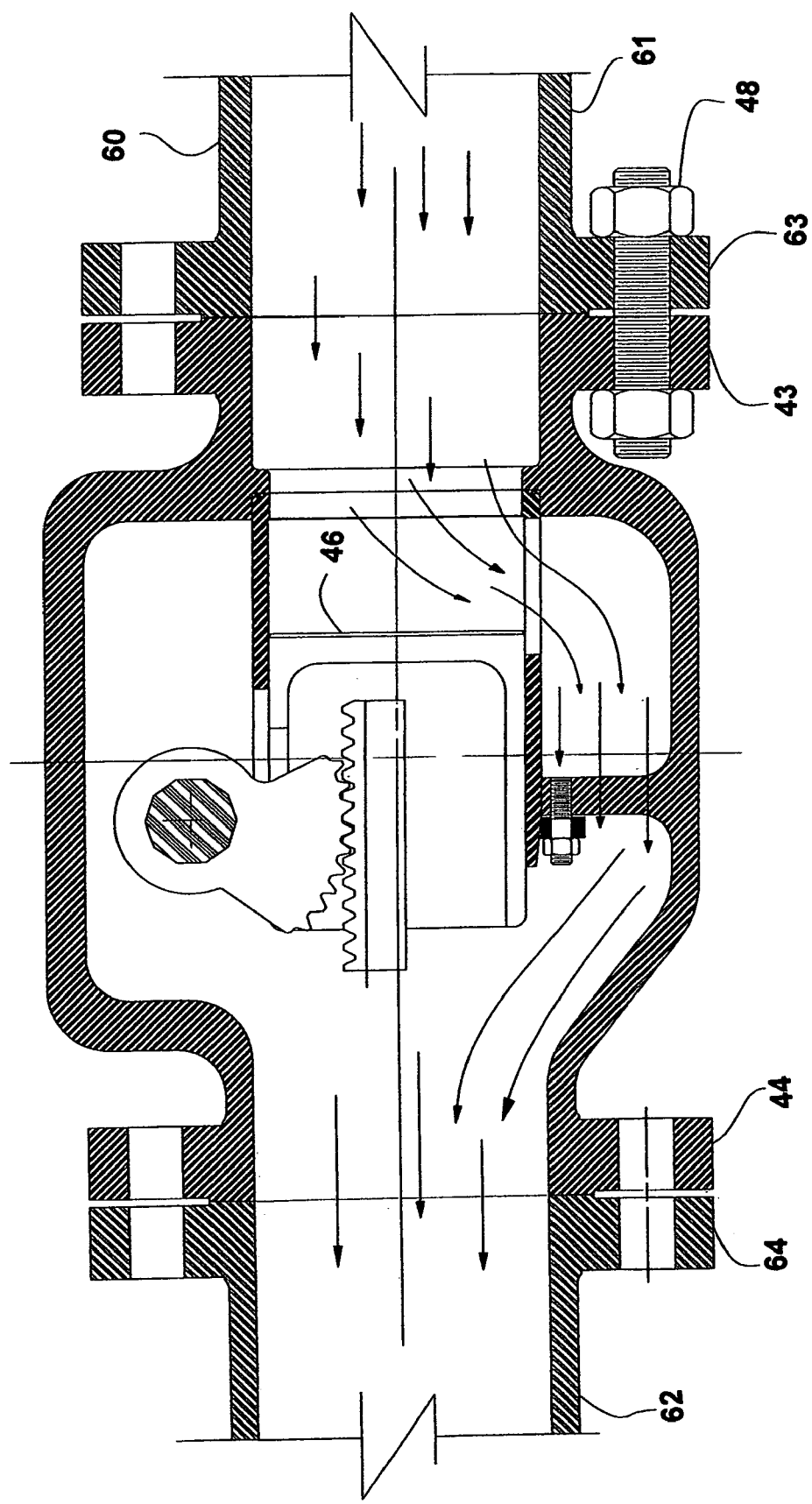
FIG. 8 is a side of a flow line containing the inline control valve of the present invention.

FIG. 8 is a side of a flow line containing the inline control valve of the present invention. An inline control valve as shown in FIG. 8 is mounted within a flow line 60 having an upstream conduit 61 and a downstream conduit 62 within opposed spaced flanges 63 and 64 are connected to flanges 43 and 44. Flanges 63 and 64 are clamped tightly against the valve body 40 by suitable stud 48 and nut 49 combinations. As shown, fluid can flow through the flow line 50 into the valve inlet and out of the valve though the outlet. Movement of the plug 46 controls the size of the valve flow path 52 and thereby controlling the flow rate.

Figure 9:
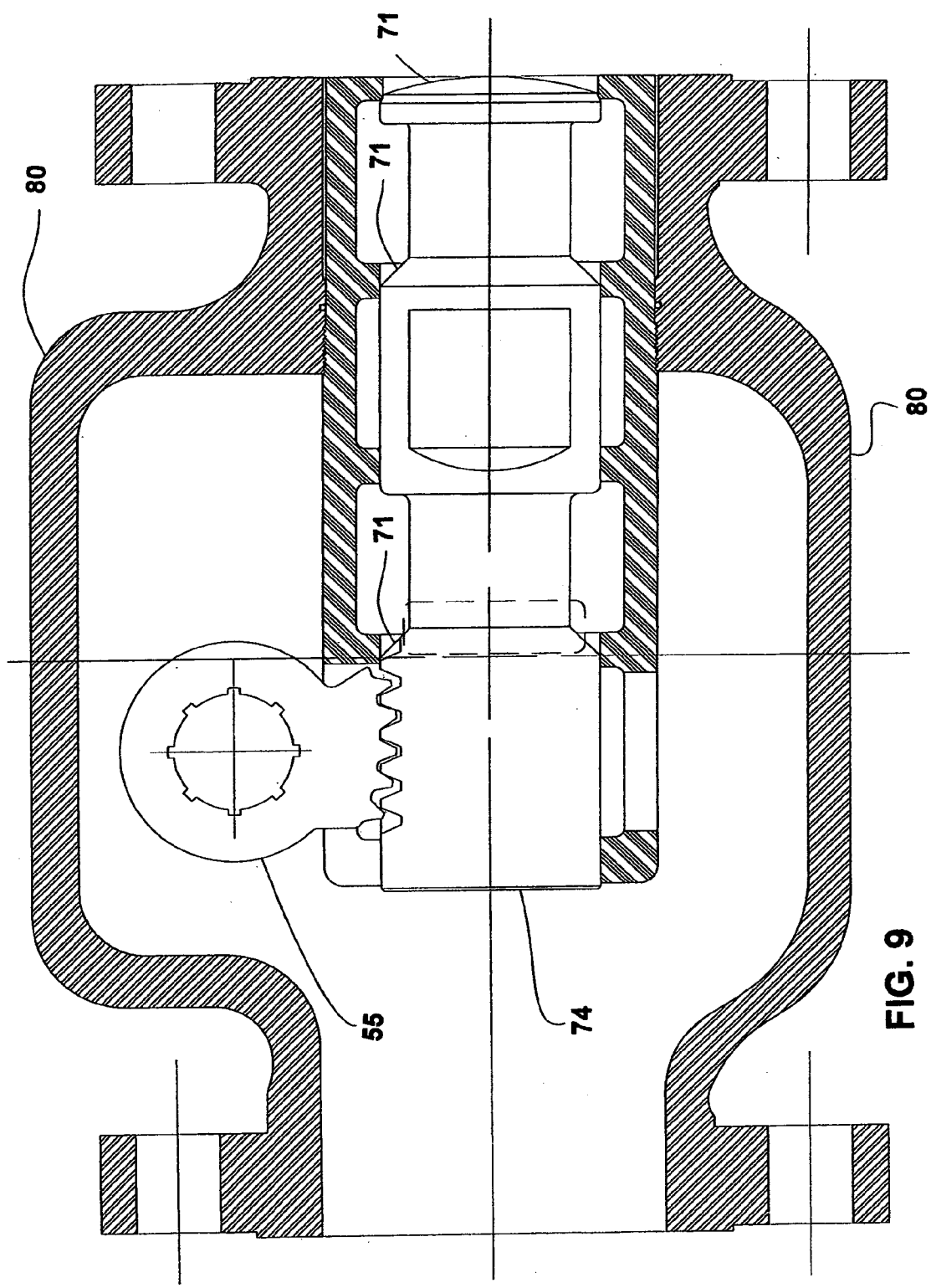
FIG. 9 is a cross-section view of a multi-stage inline control valve on the present invention.

FIG. 9 is a cross-section view of a multi-stage inline control valve on the present invention. This embodiment comprises a multi-step plug configuration 71 contained in valve housing 80. An attached shaft can rotate the pinion arm 55 such that the pinion arm rotates in a clockwise direction. This movement will cause the plugs to move in a direction toward the valve outlet 74 thereby creating a flow path around the plugs in the valve.

The apparatus of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. An externally activated inline control valve comprising:
   a valve housing connected to a flow line having an inlet through which materials enter the valve from a flow line and an outlet through which material leave the valve and re-enter the flow line;
   a plug member contained in the valve housing and positioned in a the valve housing such that said plug is in the path of materials traveling through the flow line and through the housing, said plug positioned in the housing such that said plug movement is in a direction parallel to the direction of fluid through the flowline; and
   an activation mechanism attached to said plug member to control the movement of said plug member within the valve housing, movement of the plug affecting the rate of flow of materials passing through the valve, said activation mechanism having a component that is positioned outside said valve housing and said activation mechanism further comprises: a rack sear attached to said plug; a pinion arm that engages the rack gear; and a shaft connected to the pinion arm to facilitate rotation of the pinion arm.

2. The externally activated inline control valve as described in claim 1 wherein said housing comprises a one-peace design.

3. The externally activated inline control valve as described in claim 1 further comprising a set of guide members to further control movement of said plug within said valve housing.

4. The externally activated inline control valve as described in claim 3 wherein the set of guide members comprise a cylindrical guide.

5. The externally activated inline control valve as described in claim 1 wherein said pinion arm further comprises a set of teeth for engaging said rack gear.

6. The externally activated inline control valve as described in claim 5 where said rack gear further comprises a set of teeth used to engage said teeth of said pinion arm.

7. The externally activated inline control valve as described in claim 6 wherein said shaft is perpendicularly attached to the rotary pinion arm.

8. The externally activated inline control valve as described in claim 7 wherein said shaft extends outside the valve housing to facilitate use of the shaft by a valve operator to control the movement of said plug housed in the valve housing.

* * * * *